United States Patent [19]

Petrucci et al.

[11] Patent Number: 4,948,505
[45] Date of Patent: Aug. 14, 1990

[54] QUICK-CHANGE FILTER CARTRIDGE AND HEAD THEREFOR

[75] Inventors: Raymond M. Petrucci, Middlebury; Bruce G. Taylor, Kensington; Edward C. Giordano, Manchester, all of Conn.; James M. Padilla, Covina Heights; Carl Palmer, La Habra Heights, both of Calif.

[73] Assignee: Cuno, Inc., Meriden, Conn.

[21] Appl. No.: 428,285

[22] Filed: Oct. 27, 1989

Related U.S. Application Data

[63] Continuation of Ser. No. 173,689, Mar. 25, 1988, Pat. No. 4,877,521, which is a continuation of Ser. No. 44,895, Apr. 30, 1987, Pat. No. 4,735,716, which is a continuation-in-part of Ser. No. 822,536, Jan. 27, 1986, abandoned.

[51] Int. Cl.$^5$ ............................................. B01D 27/08
[52] U.S. Cl. ....................................... 210/238; 210/282; 210/438; 210/440; 210/443; 222/189; 55/484; 55/502; 55/522
[58] Field of Search ................ 210/171, 238, 253, 282, 210/288, 438, 440, 443, 450, 500.21; 222/153, 189; 55/484, 502, 507, 522

[56] References Cited

U.S. PATENT DOCUMENTS

| | | | |
|---|---|---|---|
| 2,563,548 | 8/1951 | Plante | 210/164 |
| 2,568,181 | 9/1951 | Zimmerman et al. | 210/164 |
| 2,979,208 | 4/1961 | Humbert, Jr. | 210/232 |
| 3,217,942 | 11/1965 | Humbert, Jr. et al. | 285/130 |
| 3,313,417 | 4/1967 | Rosaen | 210/90 |
| 3,313,418 | 4/1967 | Rosaen | 210/90 |
| 3,319,791 | 5/1967 | Horne | 210/234 |
| 3,333,697 | 8/1967 | Rosaen | 210/90 |
| 3,347,386 | 10/1967 | Kraissel, Jr. | 210/238 |
| 3,358,839 | 12/1967 | Simons | 210/232 |
| 3,746,171 | 7/1973 | Thomsen | 210/234 |
| 3,852,196 | 12/1974 | Szpur | 210/234 |
| 3,859,216 | 1/1975 | Sisson et al. | 210/440 |
| 4,051,036 | 9/1977 | Conrad et al. | 210/232 |
| 4,052,307 | 10/1977 | Humbert, Jr. | 210/130 |
| 4,082,673 | 4/1978 | Cilento | 210/234 |
| 4,105,561 | 8/1978 | Domnick | 210/232 |
| 4,268,384 | 5/1981 | Rosaen et al. | 210/133 |
| 4,304,736 | 12/1981 | McMillin et al. | 99/275 |
| 4,349,438 | 9/1982 | Sims | 210/180 |
| 4,465,595 | 8/1984 | Cooper | 210/238 |
| 4,495,072 | 1/1985 | Fields | 210/238 |
| 4,497,348 | 2/1985 | Sedam | 99/275 |
| 4,520,950 | 6/1985 | Jeans | 222/129.1 |
| 4,615,812 | 10/1986 | Darling | 210/805 |
| 4,645,601 | 2/1987 | Regunathan | 210/433.2 |

Primary Examiner—Richard V. Fisher
Assistant Examiner—Wanda L. Millard
Attorney, Agent, or Firm—Weingram & Zall

[57] ABSTRACT

A filtering device includes a head intended to be permanently installed in a fluid dispensing machine and a disposable canister therefor. A central chamber is formed in the head which chamber is in communication with an inlet port and an outlet port for receiving an unfiltered liquid and supplying a filtered liquid, respectively. The disposable canister has a flask shaped main body with a flat top and a neck of substantially uniform diameter on the top. The neck fits in the central chamber. A tube extending through the neck defines an annular clearance between the tube and the interior of the neck which annular clearance is in fluid communication with the inlet port. The opening into the tube located at the top of the neck is in fluid communication with the outlet port in the head. A pair of tab receptacle on the head and a complementary pair of tabs on the canister are engageable with one another by ¼ rotation of the canister to lock the canister to the head.

6 Claims, 14 Drawing Sheets

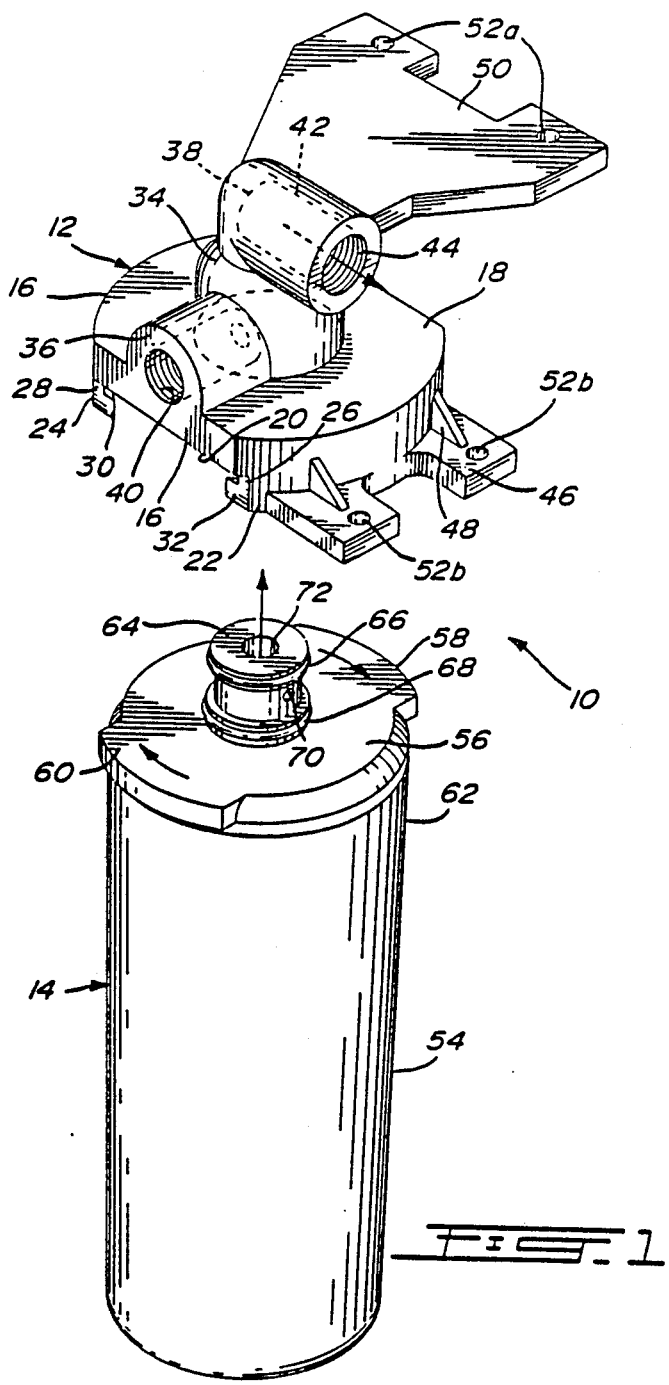

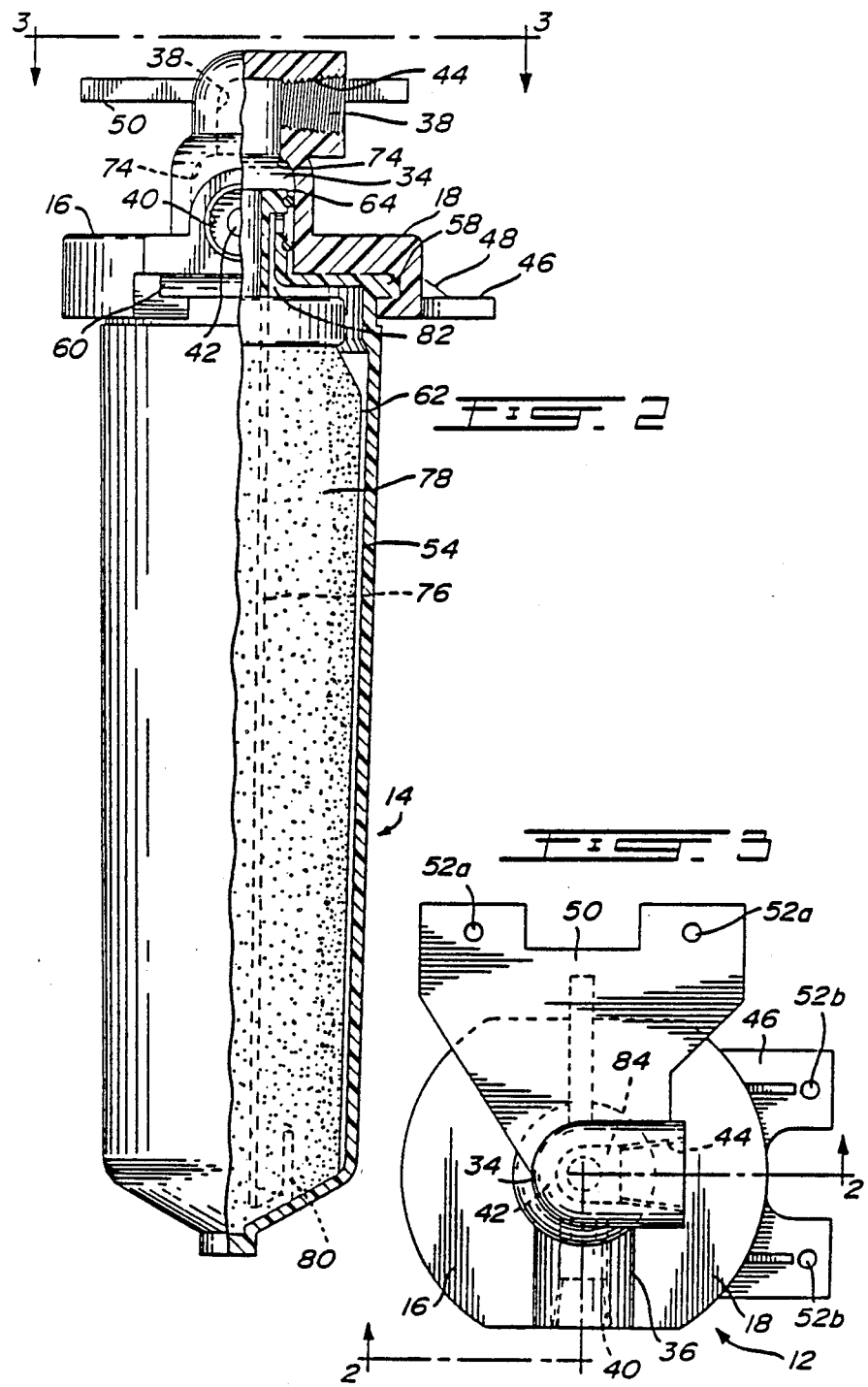

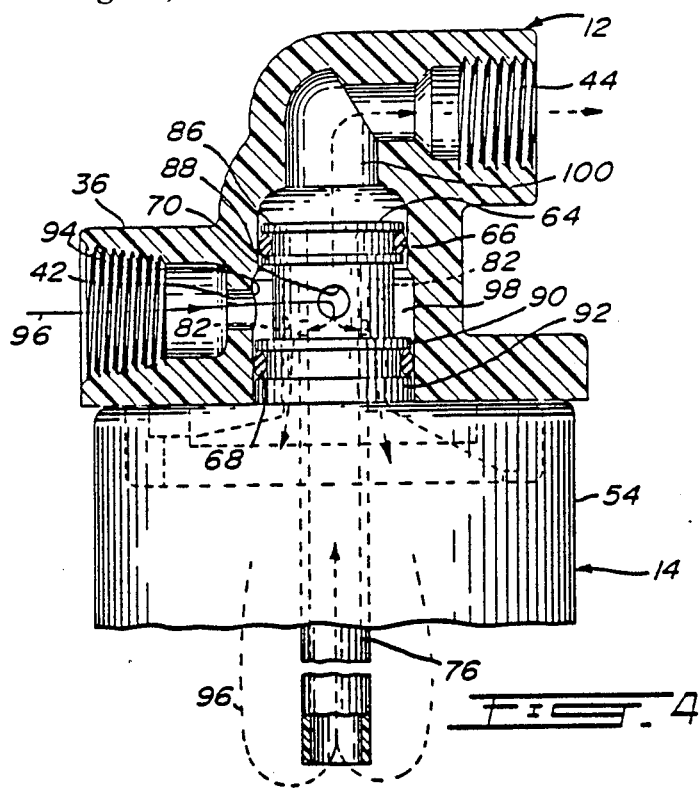
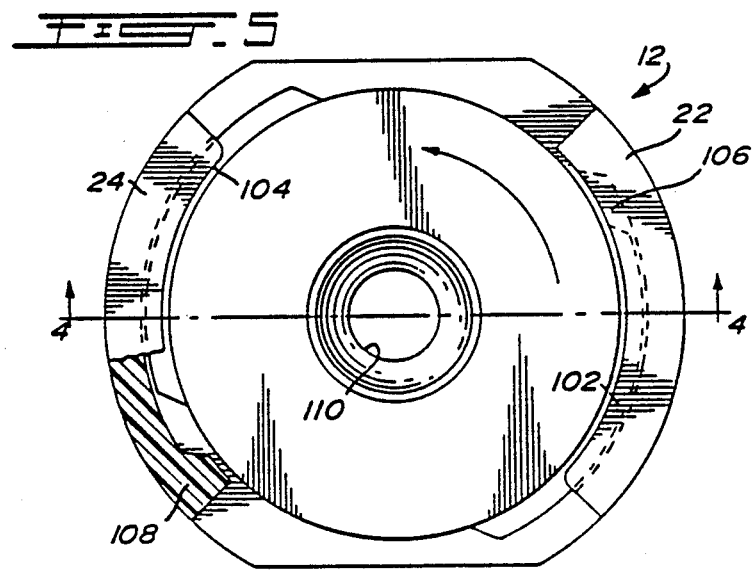

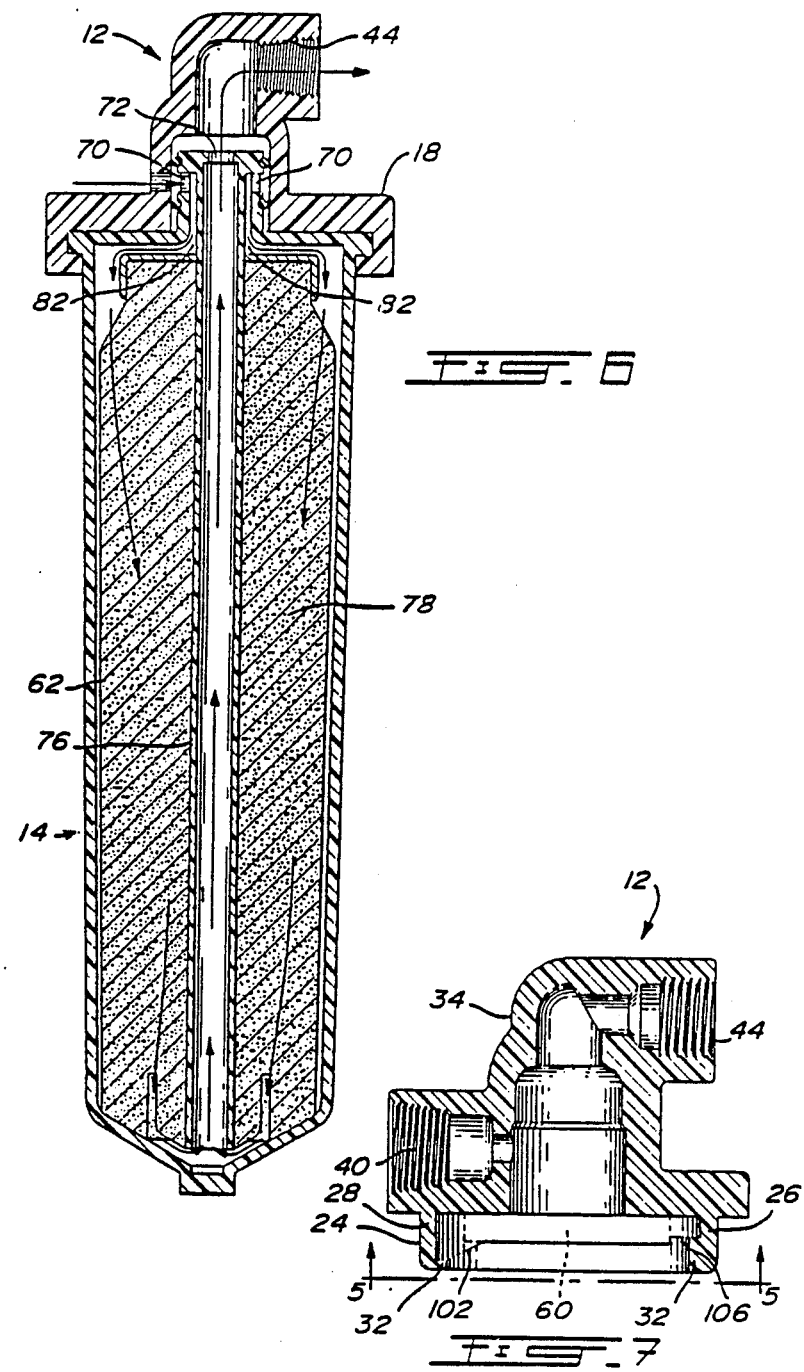

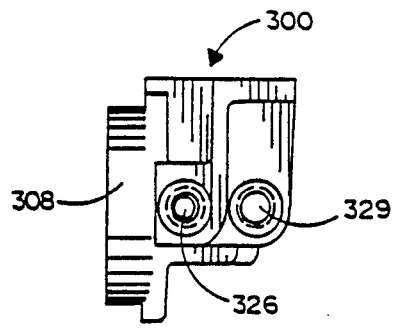
FIG. 24
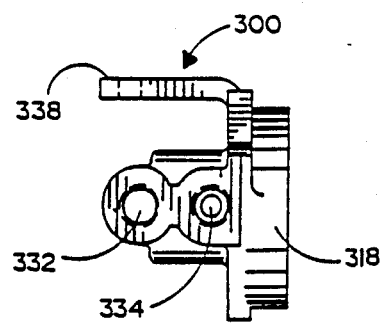
FIG. 25
FIG. 26
FIG. 27
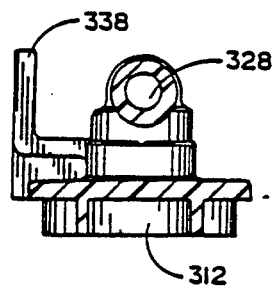
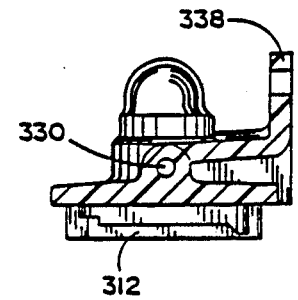

QUICK-CHANGE FILTER CARTRIDGE AND HEAD THEREFOR

RELATED APPLICATION

This application is a continuation of U.S. Ser. No. 173,689, filed Mar. 25, 1988, now U.S. Pat. No. 4,877,521 (issued Oct. 31, 1989), which is a continuation of U.S. Ser. No. 44,895, filed Apr. 30, 1987, now U.S. Pat. No. 4,735,716 (issued Apr. 5, 1988) which is a continuation-in-part of U.S. Ser. No. 822,536, filed Jan. 27, 1986, now abandoned. The entire disclosures of all of these applications are incorporated herein by reference.

BACKGROUND OF THE INVENTION

The present invention is directed to a fluid filter and more particularly to a quick change disposable filter canister for filtering liquids.

Vending machines for dispensing liquids such as coffee or soft drinks in a cup are in wide spread use in our society. It is common to filter liquids such as water in coffee machines or soft drinks before they are dispensed by circulating the liquid through an appropriate filtering device. Such filtering devices have a limited useful life and require frequent replacement.

It is therefore very helpful and desirable to construct the filter for easy and simple removal and replacement. Thus, personnel who routinely replenish the machines with supplies could also replace the filter. Since those who restock the machines are not mechanically trained and do not carry hand tools, it has been known to construct the filtering device as an assembly which includes a permanently installed head in the machine and a disposable filter canister which can be easily installed in the head by persons without mechanical skill and without use of any hand tools.

Various filters of this type have been previously described. The known filtering devices are often complex in structure which tends to increase their cost. Moreover, the wide practice has been to provide "screw on" types of filters, similar to the familiar car oil filter, which require patience and time to align the filter and to screw it into position. The known filtering devices are typified by the following examples:

U.S. Pat. No. 3,746,171 in the name of Thomsen is directed to a filter assembly which includes a permanently installed head fixedly mounted in a machine and a replaceable filter unit. The replaceable filter unit is supported in a rotatable clamping collar. Upon rotation of the clamping column the filter unit is secured in the head. The head structure is complicated by the inclusion of a shut-off valve. The mating end of the replaceable filter is conically shaped and includes two coaxial tubular portions which define input and output ports into the canister. The canister receiving opening in the head is cylindrical but has a nonuniform diameter to fit snugly over and accommodate the replaceable filter.

Other patents which appear to be relevant to the subject matter of the present invention include: U.S. Pat. Nos. 2,563,548; 2,568,181; 2,979,208; 3,217,942; 3,313,417; 3,313,418; 3,319,791; 3,333,697; 3,347,386; 3,358,839; 3,852,196; 3,859,216; 4,051,036; 4,052,307; 4,082,673; 4,105,561; 4,268,384; 4,304,736; 4,349,438; 4,465,595; 4,495,072; 4,497,348; 4,520,950; 4,615,812; and 4,645,601. The majority of the above patents are directed to various filter assemblies, particularly to such assemblies having a removable filter cartridge that is attached to some type of head. A representative group of the patent is discussed below.

U.S. Pat. No. 2,563,548 in the name of Plante discloses a gasoline filter cartridge 33 having arms 42 received in a recess 50 on the under surface of a head. The filter is threaded onto the head.

U.S. Pat. No. 2,568,181 in the name of Zimmerman et al shows outwardly projecting lugs or fins 21 on the filter cartridge which are received above stops 39 in a cover. This invention was envisioned for use in connection with automotive engines.

U.S. Pat. No. 3,217,942, to Humbert Jr. et al discloses a filter unit which is particularly adapted for use in a gas station wherein the filter is located in a dispensing handle of a gasoline hose through which gasoline is dispensed into automotive vehicles. The replaceable filter unit has a neck portion which is in fluid communication with a discharge nozzle 22 and an annular clearance around the neck which is in communication with the incoming fluid from the hose. The replaceable filter is threadedly received and supported on the gas dispensing handle.

In the patent to Horne, U.S. Pat. No. 3,319,791, there is shown a filter cartridge secured within a head. The cartridge appears to have a reduced diameter end that is received within the filter head. The end carries several O-rings and is comprised of two unequally long concentric tubes to provide an input and an output path into the filter.

In the patent to Rosaen, U.S. Pat. No. 3,333,697, a bayonet filter which is structurally dissimilar from the filter of the present invention is disclosed.

U.S. Pat. No. 4,052,307 in the name of Humbert Jr. is directed to a universal filter mounting attachment particularly for the automotive field. This filter is of the spin-on type in which there is provided an adapter having lugs which are received in slots in the filter cartridge.

In the patent to Domnick, U.S. Pat. No. 4,105,561, there is shown a cartridge having a reduced diameter end that is received in a filter head. The cartridge is surrounded by a housing 1 as shown in FIG. 1 thereof.

In the patent to Cooper, U.S. Pat. No. 4,465,595 there is disclosed a filter cartridge in a head assembly which includes means for facilitated cartridge securement and removal. This patent deals with industrial filters which are used under high pressure and which are tightened with great force onto the head.

McMillin et al, U.S. Pat. No. 4,304,736, describes an apparatus for making and dispensing carbonated beverages. Similarly, Jeans U.S. Pat. No. 4,520,950 is directed to a beverage dispenser particularly adapted for use in the home. The patent to Sedam, U.S. Pat. No. 4,497,348, shows a portable post-mix carbonated beverage dispenser unit for which the quick-change filter of the present invention is particularly useful. The remaining patents are generally relevant to art of the present invention.

A prior filter, having the designation APS17 and provided by the assignee of the present application, comprises a filter canister having a neck and a tube that extends from the neck into the canister. The opening into the tube, at the top of the neck, is sealed from other entrances into the neck by a flexible, especially provided, flat hat, rather than a seal that is located on the neck's radial periphery.

The filter assemblies of the prior art are intricate in construction and therefore less economical. The majority are screw-on types and are somewhat more cumbersome to use. There is a present need for filter canisters with combined attributes of simplicity, reliability and inexpensiveness.

SUMMARY OF THE INVENTION

Accordingly, it is an object of the present invention to provide a filter which is simple in construction.

It is another object of the present invention to provide a filter which can be most easily installed or replaced.

It is another object of the present invention to provide a filter which is inexpensive yet reliable.

The foregoing and other objects of the present invention are realized by a filtering device which includes, firstly, a head which is intended to be permanently installed in a machine, and secondly, a replaceable filter canister which can be mounted by hand and without tools in the head.

The head includes a generally flat circular plate with a bottom side which faces the canister and a top side. A pair of tab receptacles extend from the bottom and near the radial periphery of the plate. The tab receptacles form two dimetrically opposed, i.e. or 180 opposed, channels in which appropriate tabs located on the canister can be fitted to secure the canister in the head. A cylindrical upstanding central chamber is located at the center and on the top side of the plate which central chamber is accessible from the bottom of the plate. Above the plate, an inlet port and an outlet port are in fluid communication with the central chamber. The ports will be connected to appropriate liquid carrying conduits or hoses of a vending or other apparatus in which fluid filtering is to take place. Preferably, the outlet port is located at the top of the central chamber and the inlet port communicates into the central chamber through the peripheral side wall of the central chamber.

The disposable canister is generally flask or bottle shaped and includes a main housing in which filtering material is disposed. Preferably, the main housing is cylindrical and has a flat top. A reduced diameter neck portion protrudes from the top. The diameter is fairly constant and the neck is shaped to fit into the central chamber in the head.

A tube of smaller diameter than the interior diameter of the neck extends from the top of the neck almost to the bottom of the main housing. The neck is closed at the top except for the opening formed by the tube. A pair of spaced seals, preferably O-rings, are located on the cylindrical peripheral wall of the neck. An inlet opening, preferably a pair of diametrically opposed openings is located in the peripheral wall of the neck and on the surface which is bounded by the two seals. The inlet openings provide a fluid communication path into an annular clearance which is defined between the interior of the neck and the tube.

Fluid will enter the disposable canister through the inlet openings and flow through the filtering media disposed in the interior chamber of the main housing. Upon reaching the bottom of the housing, the now filtered liquid will rise through the tube and exit the canister at the top of the neck.

A pair of tabs project radially from the main housing. The tabs are about level with the top surface of the main housing, and can be approximately 180 degrees apart as shown in FIGS. 1 and 5 of the drawings. To install or replace the disposable canister, the tabs are misaligned with the tab receptacles on the head to permit the neck of the canister to enter the central chamber in the head. Thereafter the canister will be turned through an angle less than 180 degrees, preferably about a 90 degree or quarter turn, to lock the tabs in the channel formed by the tab receptacle in the head. The two O-rings on the head will make a slip-connection with the interior surface of the central chamber. The neck and the seals are so located that the tube opening at the top of the neck will be in sealing relationship with the outlet port in the central chamber and the inlet openings between the two seals will be in sealing relationship with the inlet port.

The head and disposable canister are preferably constructed of molded plastic material. The head is preferably a single integral molded piece which also includes a pair of flanges which are employed to mount the head in the vending machine through appropriate screws or bolts.

In one embodiment of this invention the neck except for the O-ring grooves therein is a cylinder having an approximate uniform diameter throughout its height. In one embodiment of this invention the upstanding chamber of the head contains no seal means. In other words the upstanding chamber of the head is completely free of any seal means and all of the seal means required to prevent direct fluid communication between inlet and out ports of the head are physically located on the neck of the canister intended to be inserted into the upstanding chamber of the head. By having the upstanding chamber of the head completely free of seal means no additional disassembly time is required to replace the seal means because new seals are attached to the neck of the disposable canister. This means that in one embodiment of this invention it is not necessary to remove the head from its permanent mount or to probe inside the upstanding chamber to remove O-rings or other seals which could result in detrimental scaring of seal seating surfaces in order to replace the seal means between the canister and the upstanding chamber of the head.

In another embodiment of this invention there is provided an integrally constructed multi-head structure for receiving two or more disposable canisters in which the multi-head structure has, as part of its integral construction, passageways connecting the outlet of one head to the inlet of another head.

According to the principal of this invention there is provided a replacement filter canister for a permanently installed filter head of a type having inlet and outlet ports in fluid communication with a central chamber which is intended to receive said filter canister, said filter canister comprising a flask shaped housing having a main body with a top surface and neck projecting from said top surface, said neck being intended to be loosely received and rotatable in said central chamber of said head, said neck having an external surface and an internal surface; tube means disposed in said housing, said tube means having an upper part extending into said neck and a lower part in sealed fluid communication with said upper part and extending below said neck, the cross-sectional area of said upper part of said tube being smaller than the adjacent internal cross-sectional area of said neck proximate thereto to define a clearance therebetween, said tube means for conveying fluid; and filter means for filtering fluid, said filter means being contained in said housing and being adapted around said lower part of said tube means, said filter means having an inlet and an outlet, said inlet of said filter means being in sealed fluid communication with said clearance, said outlet of said filter means being in sealed fluid communication with said lower part of said tube means.

The canister also comprises sealing means for sealing said clearance from fluid communication with the interior of said tube means except through said filter means, whereby fluid communication between said clearance and said tube means occurs only through said filter means; a first seal disposed circumferential around said external surface of said neck and proximate to the upper end thereof, said first seal being retained by retaining means on said neck, said first seal making slip-contact with the interior surface of said central chamber of said head, said first seal and said external surface of said neck above said first seal intended to form a first space bounded in part thereby and in part by said central chamber of said head such that one of said inlet and outlet ports in said head is in sealed fluid communication with said first space; and a second seal disposed circumferentially around said external surface of said neck and disposed below said first seal, said second seal being retained by retaining means on said neck, said first and second seals and said external surface of said neck therebetween intended to form a second space bounded in part thereby and in part by said central chamber of said head such that the other one of said inlet and outlet ports in said head is in sealed fluid communication with said second space.

The canister further comprises a first opening into said neck in sealed fluid communication with said clearance and one of said first and second spaces; and a second opening into said neck in sealed fluid communication with said upper part of said tube means and the other one of said first and second spaces, whereby fluid flowing into or out of said canister through said first space will flow out of or into, respectively, said canister through said second space, wherein the external end of one of said first and second openings is spaced below said first seal and above said second seal and extends in a radial direction from said neck, and wherein the external end of the other one of said first and second opening is located above said first seal.

The canister further comprises securing means for securing said canister to said head, said securing means including radially projecting tabs located on said main body of said housing, said tabs being intended to be insertable into said head through tab clearances located on said head and supported in tab receptacles located on said head whereby insertion of said tabs of said canister into said tab clearances in said head followed by rotation of said canister through an angle less than 180 degrees relative to said head will cause said tabs of said canister to be supported by said tab receptacles of said head.

By the term "filter means" as used herein, is meant any device effective for separating a feed liquid-containing substance into a product liquid-containing substance of less undissolved solids and/or dissolved solids content than the feed liquid-containing substance and a filtrate or concentrate or permeate. Thus non-limiting examples of filter means as used herein include activated carbon filters, permeable sediment filters and reverse osmosis modules.

Other features, advantages and uses of the present invention will become apparent from the following description of a preferred embodiment of the present invention which is described in conjunction with the appended drawings.

BRIEF DESCRIPTION OF THE DRAWINGS

FIG. 1 is a perspective of the head and the disposable canister.

FIG. 2 is an elevational cross section through the disposable canister which is mated with its head, the view taken along lines 2—2 of FIG. 3.

FIG. 3 is a top view of the head along lines 3—3 in FIG. 2.

FIG. 4 is a cross-sectional enlarged view through the disposable canister which is mated with its head.

FIG. 5 is a bottom view of the head along lines 5—5 of FIG. 4.

FIG. 6 is yet another cross section elevational view through the disposable canister and its head, the figure indicating the fluid flow through the head and the disposable canister.

FIG. 7 is a section through lines 7—7 in FIG. 5.

FIG. 24 is an end elevational view of the head of FIG. 20 through plane 24—24.

FIG. 25 is an end elevational view of the head of FIG. 20 through plane 25—25.

FIG. 26 is an elevational sectional view through plane 26—26 of FIG. 21.

FIG. 27 is an elevational sectional view through staggered line 27—27 of FIG. 21.

DETAILED DESCRIPTION OF THE INVENTION

Figure 8:
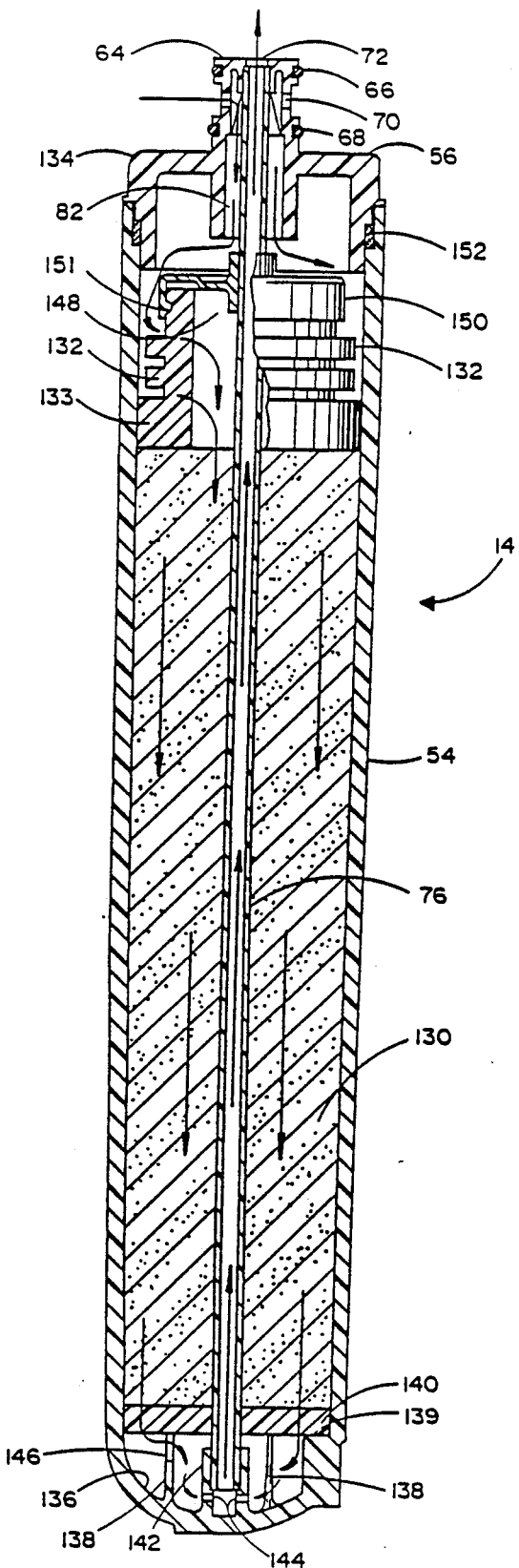
FIG. 8 is another embodiment of a canister of this invention containing a bed of activated carbon.

A preferred embodiment of the present invention will now be described by reference to the figures which will be taken up in sequence. Thus, in referring to FIG. 2 only those elements and features of the present invention not previously described in relation to FIG. 1 will be described and so on for the remaining figures. Like elements will bear like numerals throughout the figures.

As shown in FIG. 1, a filtering device 10 includes a head 12 and a disposable canister 14. The head 12 is an integral piece, preferably molded of plastic, which includes a circular flat plate 16 with a top surface 18 and a bottom surface 20. A pair of diametrically opposed arcuate shaped tab receptacles 22 and 24 depend from the bottom side 20 of the plate 16 and are intended for supporting the disposable canister 14. The tab receptacles 22 and 24 include, respectively, an upstanding arcuate wall 26 and 28 a reentrant cam wall 30 and 32 as shown. Note that the illustrated section of reentrant wall 32 is narrower in thickness than the thickness of the right sided reentrant wall 30; The narrowed thickness section represents a tapered beginning cam surface which facilitates rotation of the disposable canister 14 while the increased thickness section is a stop block which will prevent the disposable canister 14 from rotating more than about 90 degrees.

On the top side of the plate 16 is located an upstanding central chamber 34 as well as an inlet port 36 and an outlet port 38. The inlet port 36 has a threaded opening 40 for receiving an inlet hose as well as a reduced diameter nozzle 42 which communicates into the central chamber 34. Similarly, the outlet port 38 includes a threaded opening 44 to which an outlet hose (not shown) of a vending machine or a similar suitable apparatus can be attached. The outlet port 38 communicates with the central chamber through a top opening (not shown) in the central chamber 34.

A pair of integrally formed supports including a first support 46 connected to the plate 16 and reinforced by wedges 48 as well as a second support 50 protrude from the head 12. Support 50 is provided for mounting head 12 to a support structure (not shown) in the vending machine or the like and support 46 is intended for mounting, for example, a temperature probe or other monitoring devices. Screw or bolt holes 52a in the support 50 will be used for securing the head to the machine. Holes 52b will be used for securing the monitoring devices to the head 12.

Disposable canister 10 is seen to include a main housing 54, preferably cylindrically shaped, which housing has a generally flat top 56 and a pair of tabs 58 and 60 protruding radially from the top 56. The housing 54 may include the top 56 which is mated together with a bottom portion 62 of a housing when a filtering material (not shown) is disposed in the housing. A preferred filter media for use in filtering water for soft drinks and in particular carbonated water, is activated carbon. Pre and post filtering media may also be included in the canister. See patent application Ser. No. 822,384 filed Jan. 27, 1986, entitled "Process for Filtering Potable Carbonated Water" to Barnes, et al which is assigned to the assignee of the present application. The entire disclosure thereof is incorporated herein by reference.

A neck 64 of substantially uniform outer diameter projects from the top 56 of main housing 54 and a pair of seals, preferably O-rings, which include an upper O-ring 66 and a bottom O-ring 68 are mounted on the neck 64. A pair of diametrically opposed openings including a first inlet opening 70 provide an inlet path into the interior of the main housing 54. A tube opening 72 at the top of the neck provides a second conduit into the bottom of the housing through a tube which will be described later herein.

FIG. 2 is a section along line 2—2 in FIG. 3 and thus the left side portion thereof is an outside view of the left side of the canister and head and the right side is a sectional view. The central chamber 34 is shown to have substantially uniform diameter with curving top surfaces 74 which define an opening into the output port 38. The relative sizes of the threaded opening 40 of the input port 36 and the reduced diameter nozzle 42 into the central chamber are also shown. Tube 76 extends from the neck 64 and through filtering material 78 to the bottom 80 of main housing 54. Note the annular clearance 82 between the peripheral wall of the neck and the tube 76.

The top view of FIG. 3 shows by appropriate dashed lines the relative dimensions of the threaded openings in the input and output ports as well as their respective nozzles 42 and 44 which communicate into central chamber 34.

In the cross-sectional view of the head and the upper portion of the disposable filter in FIG. 4, the neck 64 is shown to have a respective pair of annular projections 86, 88 and 90, 92 for supporting the seals 66 and 68 against movement during insertion of the neck 64 into the central chamber 34. Each pair of annular projections form a seal seat for its respective seal. Preferably, the outer diameter of the first O-ring 66 is smaller than that of the second O-ring 68 to facilitate insertion of the neck past the protruding edge 94 of inlet port 36. Note again annular clearance 82 defined between the inner peripheral wall of neck 64 and tube 76.

Liquid flow through the head 12 and the disposable canister 14 is along the path shown by arrows 96. As should be apparent liquid conducting hoses (not shown) will carry the liquid into the input port 36 wherein the liquid will flow through nozzle 42 into the annular space 98 located between O-rings 66 and 68 outside neck 64. The nozzle 42 is displaced 90 degrees from the inlet opening 70. This, the liquid will flow for about 90 degrees in two directions to enter annular clearance 82 located between the neck and the tube. As the arrows 96 indicate the liquid will now flow to the bottom of the interior of the housing, all the while being filtered by the filtering material 78 located in its path until at the bottom 80 the liquid enters into the tube 76.

In the tube the liquid will rise and empty into the upper region 100 of the central chamber, the upper O-ring 66 sealing region 100 from the inlet space 98. The lower O-ring 68 will prevent the incoming liquid from escaping between the head and the main housing. Note in this figure the general shape of the inlet and outlet ports. Note too, that for convenience the outlet port is shown in the same plane as the inlet opening although in the prior figures the inlet and outlet ports are disposed at 90 degrees with respect to each other.

FIG. 5 provides a bottom view of the head 12 also showing the top 56 of main housing 54 turned at an angle of about 45 degrees relative to the head 12. In this view may be seen on the right tab receptacle 22 a tapered section 102 which will facilitate turning of the disposable canister even if the canister is not fully in abutment against the bottom of the head. Note that a similar tapered section 104 is also provided on tab receptacle 24. On the other end of the tab receptacles, end of travel stoppers 106 and 108 are formed.

FIG. 6 is an elevational cross section which is similar to the view provided in FIG. 4 except that disposable canister 14 and head 12 are turned 90 degrees to provide a better view of inlet openings 70 into the annular clearance 82 formed between the neck and the tube.

FIG. 7, which is a cross section through line 7—7 of FIG. 5, is a better view of the tapered section 102 of head 12 and of end of travel stop 106 which will stop the canister after a one quarter turn.

The head 12 and filtering canister 14 of the present invention are seen therefore to be relatively simple in construction and easily and economically fabricatable. In one embodiment of this invention the overall length of the canister or filter is about 8 to about 10 inches and its diameter is such that it can be easily grasped and handled by one hand. The head is dimensioned to compliment the size of canister 14.

In still another embodiment the overall length of canister is from about 12 to about 14 inches and its diameter is from about 2 to about 3 inches.

FIG. 8 is another embodiment of a disposable canister of this invention which contains a bed of activated charcoal operable for removal of organic materials and chlorine from water. Canister 14 comprises main housing 54, bed of activated charcoal 130 surrounding tube 76, permeable filter inlet means 132 and housing cover 134. Inlet means 132 contains portion 133 which is compression-fitted against main housing. Inner bottom portion 136 of the housing contains support members 138 and shoulder 139 for supporting permeable disk 140 and support member 142 for supporting the bottom of the tube centrally in the main housing. Openings 144 in member 142 and openings 146 in members 138 allow water from bed 130 and disk 140 to enter the open bottom of tube 76.

Bed 130 is confined between disk 140, main housing 54 and permeable filter inlet means 132. Means 132 is permeable to water and is operable for distributing water to the top of bed 130. Means 132 is preferably constructed from pure white cellulose fibers which are arranged permanently in the form of a porous, rigid cylindrical-like structure with spaces between the fibers becoming gradually smaller towards center cavity 148. Annular member 150, preferably constructed from plastic, is joined to the tube and seals the upper part of cavity 148 from direct communication with annular clearance 82. Member 150 is bonded to inlet means 132 by inner peripheral lip 151 which tightly squeezes against the outside cylindrical surface of inlet means 132. Housing cover 134, better seen in FIGS. 10 to 13, contains diametrically opposed tabs 58 and 60, and neck 64 which contains two radially extending openings 70 and axial opening 72. The upper part of tube 76 is bonded centrally to the interior of the neck proximate to opening 72. Cover 134 is bonded to main housing 54 by induction welding of fusible substance 152 to both cover and housing.

The neck of housing cover 134 contains bore 154 adapted to be shrink-fit bonded to tube 76. Inward of openings 70 in the neck are four innermost longitudinally-extending slots 155 which serve as passageways between openings 70 and annular clearance 82. Water directed at openings 70 flows through slots 155 into annular clearance 82 and thence into permeable filter inlet means 132 as shown by the arrows. Filtered water from activated carbon bed 130 flows through disk 140 into the bottom of tube 76 and thence is discharged from the canister through opening 72 as shown by the arrows.

Figure 9:
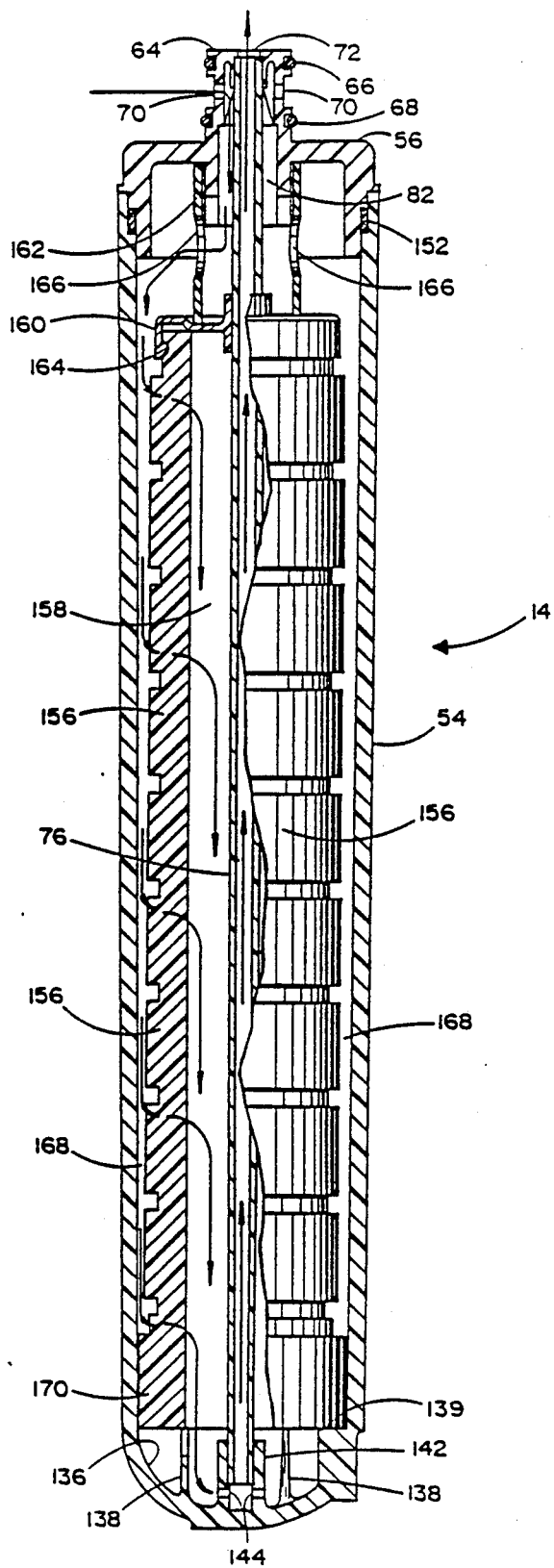
FIG. 9 is another embodiment of a canister of this invention containing a tubular filter module for sediment removal.
Figure 10:
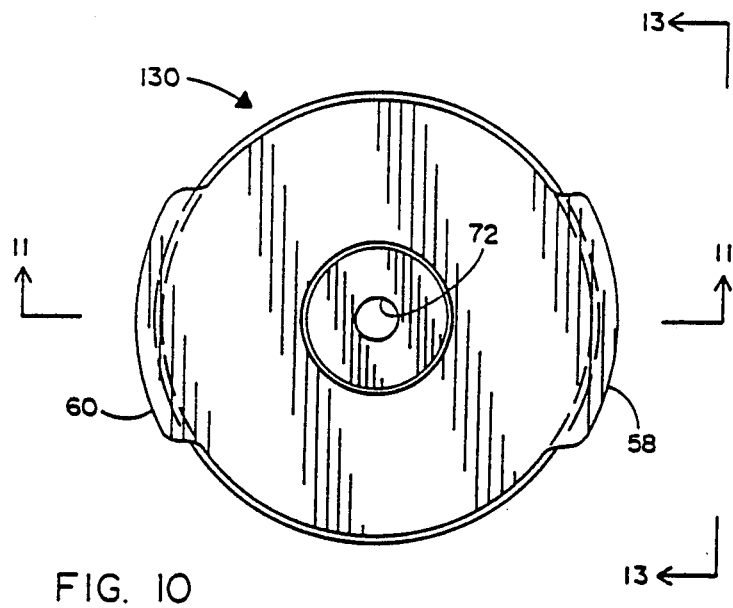
FIG. 10 is a top plan view of a cover for the canisters of FIGS. 8 and 9.
Figure 11:
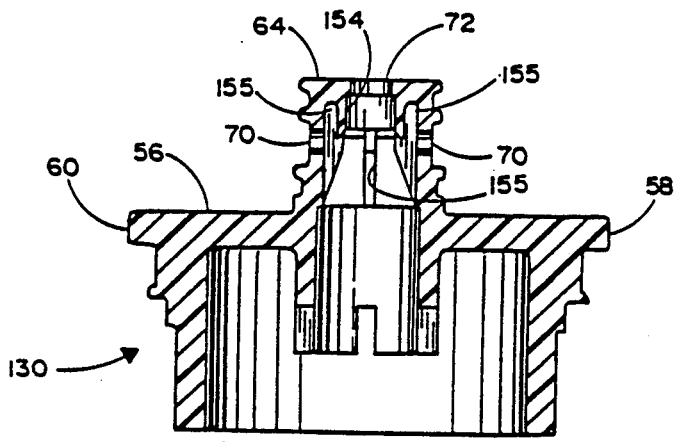
FIG. 11 is an elevational cross-sectional view of the cover of FIG. 10 through line 11—11.
Figure 12:
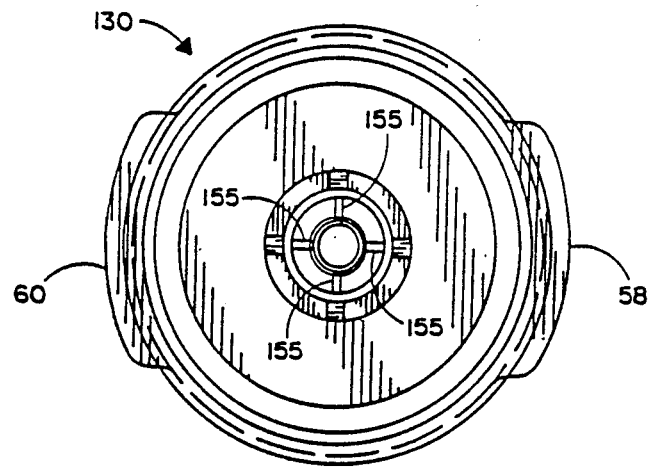
FIG. 12 is a bottom plan view of cover of FIG. 10.
Figure 13:
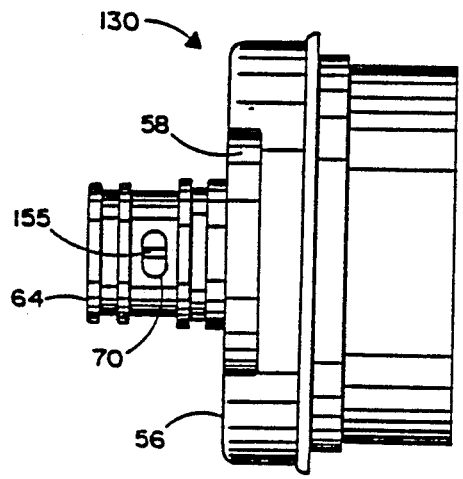
FIG. 13 is a side elevational view of the cover of FIG. 10 through line 13—13.

FIG. 9 is another embodiment of a disposable canister of this invention which contains a sediment or prefilter operable for removing fine particulate matter from water before such water is introduced into more sensitive filtration means such as reverse osmosis modules. The embodiment of this invention shown in FIG. 9 utilizes the same main housing 54, housing cover 134 and fusible substance 152 as used in the activated carbon filter shown in FIG. 8. Thus cover 134 is intended to be used for several embodiments of this invention.

Figure 14:
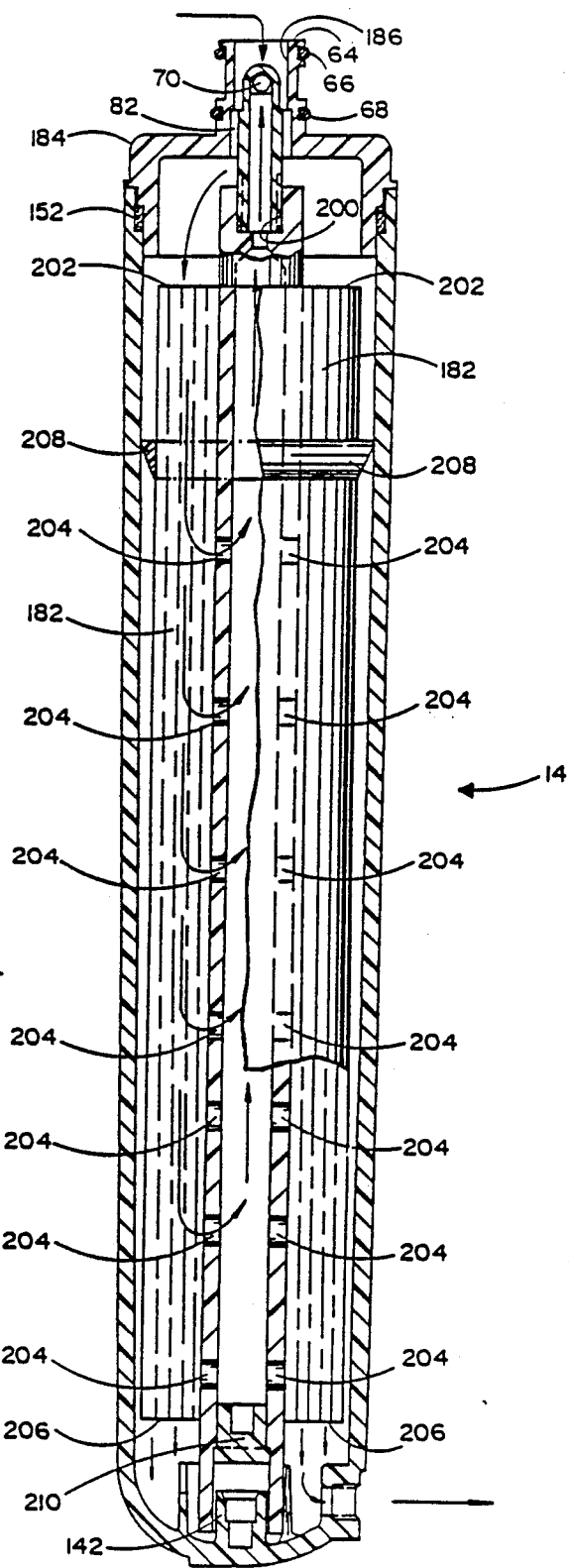
FIG. 14 is another embodiment of a canister of this invention containing a reverse osmosis module.
Figure 15:
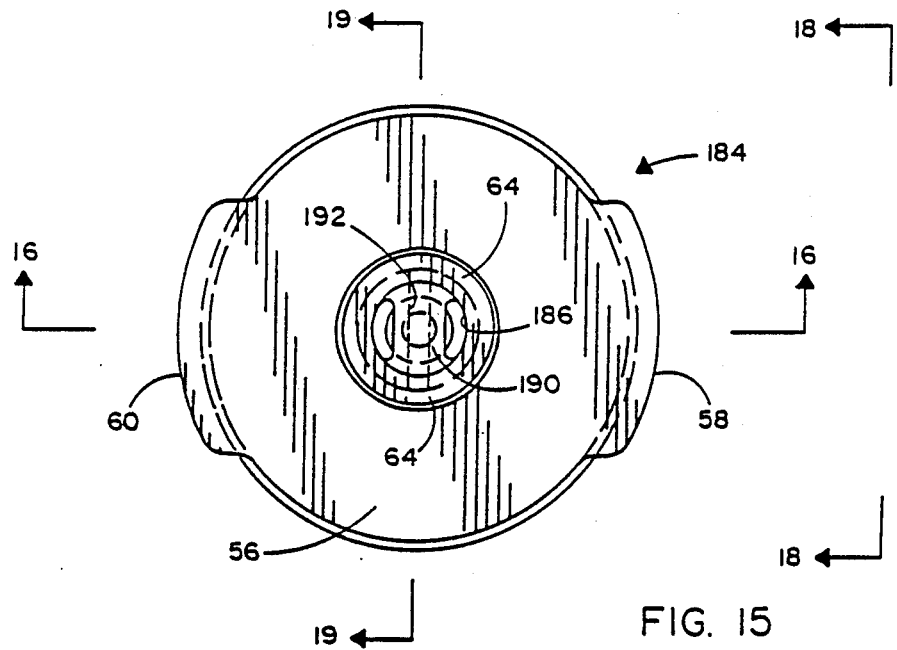
FIG. 15 is a top plan view of a cover for the canister of FIG. 14.
Figure 16:
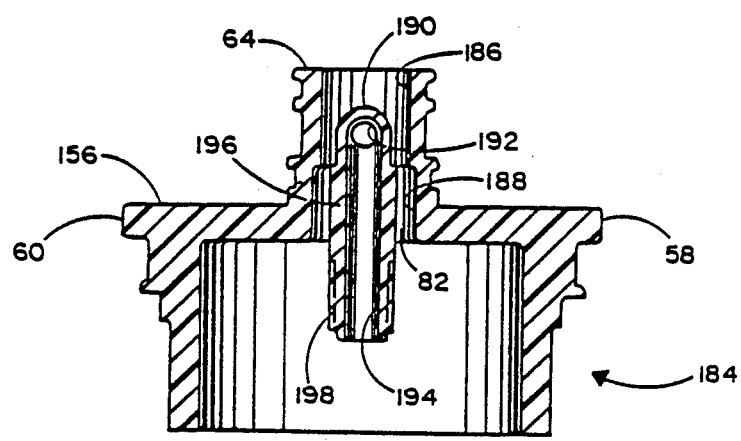
FIG. 16 is an elevational cross-sectional view of the cover of FIG. 15 through line 16—16.
Figure 17:
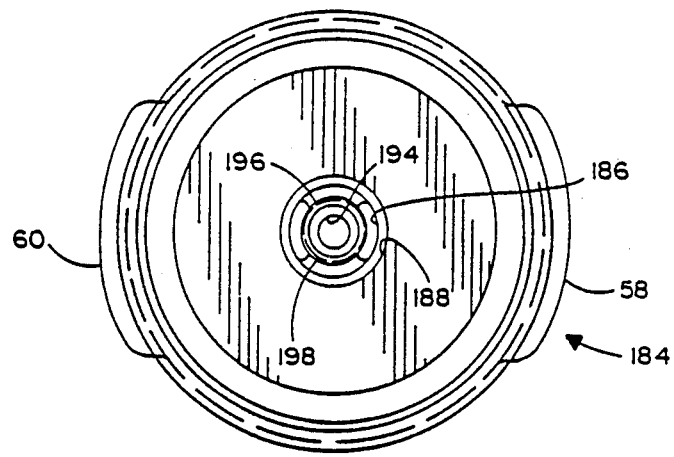
FIG. 17 is a bottom plan view of the cover of FIG. 15.
Figure 18:
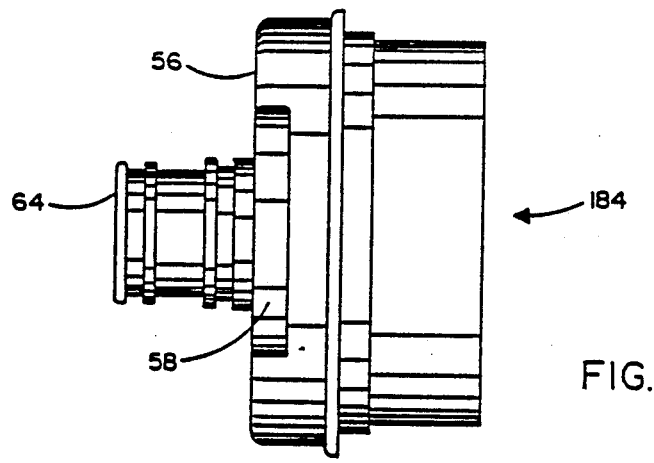
FIG. 18 is a side elevational view of the cover of FIG. 15 through line 18—18.
Figure 19:
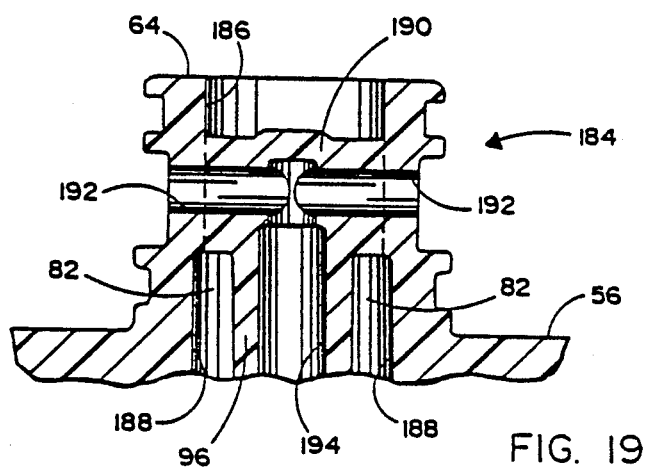
FIG. 19 is a fragmented elevational cross-sectional view of the neck of FIG. 15 through line 19—19.

Sediment filter element 156 is constructed from pure white cellulose fibers which are arranged permanently in the form of a porous, rigid cylindrical-like structure with spaces between the fibers becoming gradually smaller towards center cavity 158. As in FIG. 8, tube 76 is supported and centrally positioned in the housing by member 142 and by bore 154 in the neck. Filter element 156 is supported by members 138 and shoulder 139 and rigidly fastened in the canister by annular members 160 and 162 which are preferably made of plastic. Member 160 is bonded to filter element 156 by inner peripheral lip 164 which tightly squeezes against the outside cylindrical surface of the filter element. Member 162 contains openings 166. Water directed at openings 70 flows into the canister through slots 155, thence into annular clearance 82, thence through openings 166, and thence into filter element 156 as shown by the arrows in FIG. 9. The outside diameter of filter element 156 is smaller than the inside diameter of main housing 54, except at the bottom thereof, thereby forming annular clearance 168. Clearance 168 allows water to enter filter element 156 over almost its entire length. Although filter element 156 is rigid, the material is such that it can be compressed and this property allows bottom part 170 of the filter element to be compression fitted against the bottom part of the main housing. A preferred embodiment of a filter element suitable for use as a sediment or prefilter is brand AP110H/C CARTRIDGE of Cuno Incorporated. Inlet means 132 of FIG. 8 is preferably constructed from the same type of material as filter element 156. Returning to FIG. 9, filtered water from filter element 156 flows into holes 144 to tube 76 and thence is discharged from the canister through opening 72 as shown by the arrows. FIG. 14 is another embodiment of a disposable canister of this invention which contains a reverse osmosis module for removing solutes and finely divided undissolved material, including bacteria, from water. The embodiment shown in FIG. 14 uses the same main housing as used in FIGS. 8 and 9 but with outlet 178 for the removal of brine or concentrate. The embodiment of FIG. 14 utilizes a different cover than used in FIGS. 8 and 9.

The canister of FIG. 14 comprises lower central tube 180, reverse osmosis module or "RO module" 182, main housing 54 and housing cover 184 which is shown in greater detail in FIGS. 15 to 19. Housing cover 184 for the disposable ROM canister consist of neck 64 upper and smaller bore 186, lower and slightly larger bore 188 and traverse member 190 which contains traverse or radial bore 192 which is in sealed fluid communication with bore 194 contained in upper tube extension part 196. Bore 186 and 188 are not in direct communication with bores 192 and 194 as will be further explained.

Upper tube extension part 196, sometimes referred herein as upper part of tube means, contains externally threaded part 198. Lower central tube 180, sometimes referred to herein as lower part of tube means, contains on the upper end thereof internally threaded part 200 which is adapted to be screwed onto threaded part 196 thereby joining bore 194 in sealed fluid communication with the internal bore of lower tube 180.

RO module 182 is preferably a conventional spiral wound configuration comprising a feedwater spacer, semi-permeable membrane and a permeate or product water spacer whereby feed water directed at inlet end 202 of RO module flow through the feedwater spacer under a predetermined pressure operable to cause separation of a permeate or pure water by the membrane. Such permeate passes through the membrane and into the product water spacer of the RO module and thence through elongated slots 204 in tube 180. Concentrate continues to flow downward in the feedwater spacer of the RO module and is eventually discharged therefrom at outlet end 206. Annular seal 208 on the outside of the RO module is wedged fitted against the main housing of the canister and is operable for preventing feed water from by-passing the RO module and merely discharging directly through outlet 178.

When in use, water directed at opening or bore 186 in the neck will flow into the canister through annular clearance 82 formed by bore 188 and the external portion of upper part 196, thence into inlet end 202 of the RO module. Permeate or pure water separated in the RO module enters lower tube 180 through slots 204, thence to bore 194 in upper part 196, and thence to bore 192 in the neck. Concentrate or brine from outlet end 206 of RO module is discharged through outlet 178 to a suitable conduit for disposal or recycle.

Lower tube 180 is sealed off from concentrate outlet end 206 by plug 210. The lower end of tube 180 is held centrally in canister by support member 142 which extends upwards inside of tube 180 a small distance from the bottom thereof.

Cover 184 is bonded to main housing 54 by induction welding of fusible substance 152 to both cover and housing as dicribed for the canisters of FIGS. 8 and 9. In all of the above discribed preferred embodiments it is intended that the external dimensions of the necks and covers; i.e. the various outside diameters of the neck, the O-ring sizes, and tabs 58 and 60 are identical so that any of the canisters can be mounted in any of the preferred heads.

Figure 20:
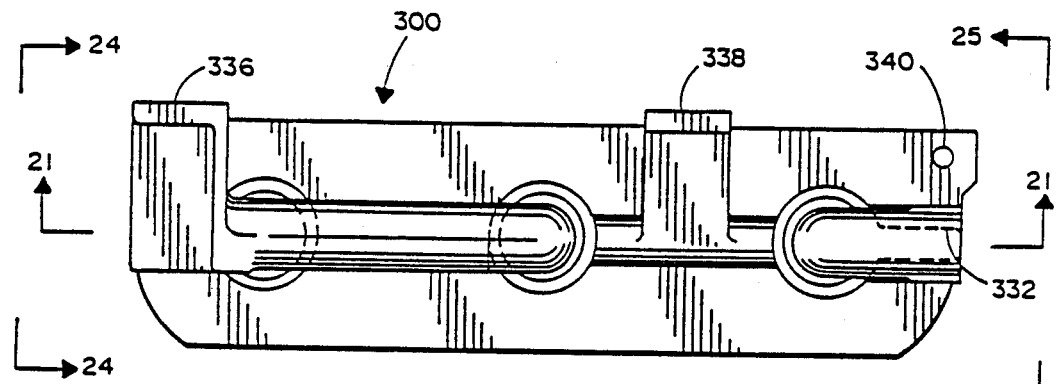
FIG. 20 is a top plan view of a triple head of this invention which will accept three replacement filter canisters of this invention.
Figure 21:
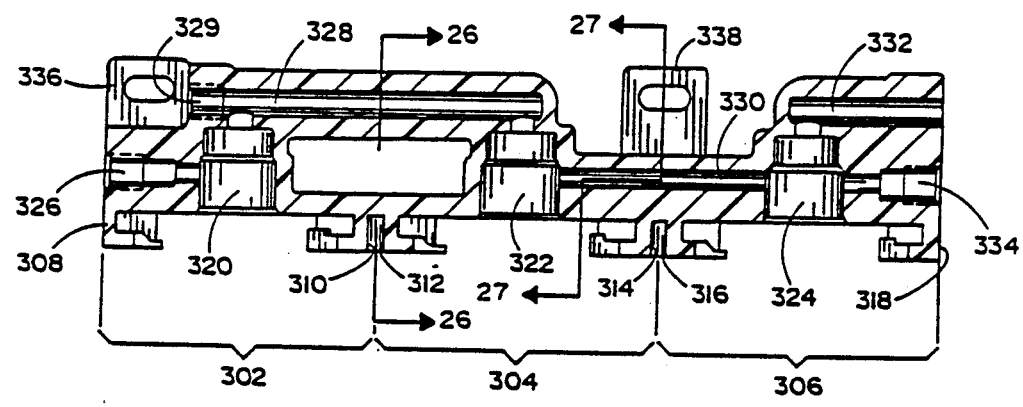
FIG. 21 is an elevational cross-sectional view of the head of FIG. 20 through plane 21—21.
Figure 22:
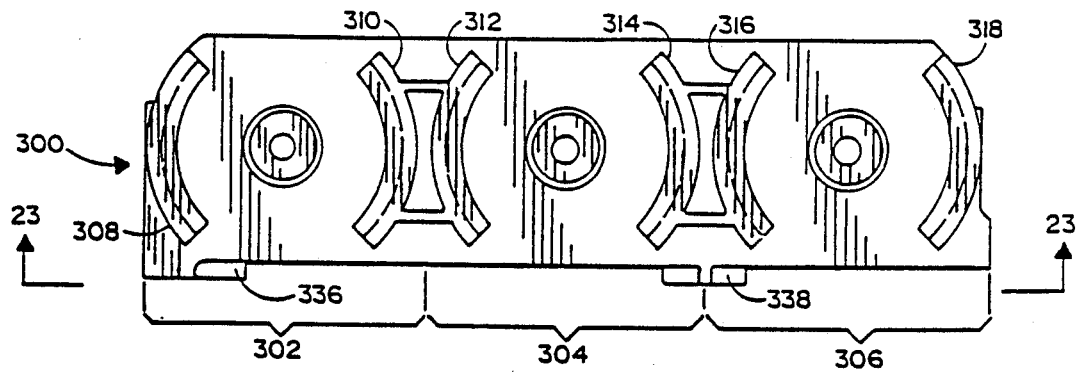
FIG. 22 is a bottom plan view of the head of FIG. 20.
Figure 23:
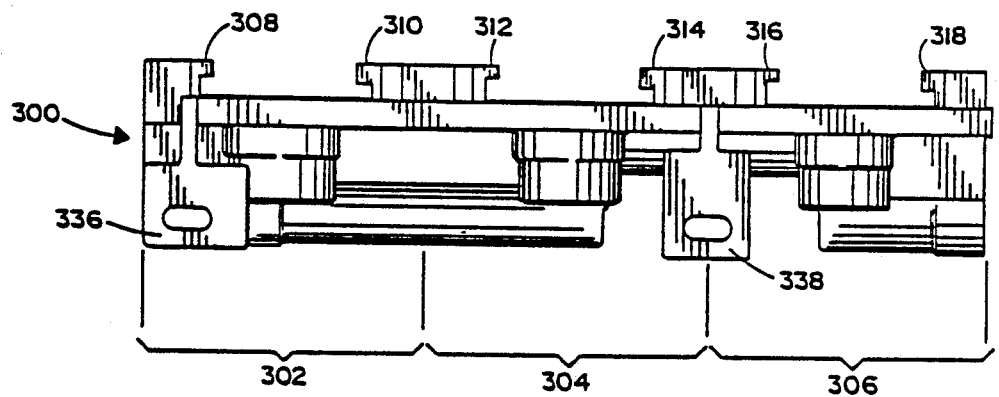
FIG. 23 is a side elevational view of the head of FIG. 22 through plane 23—23.

FIGS. 20 to 27 depict one embodiment of an integrally formed triple head structure 300 of this invention designed to hold three disposable canisters. FIG. 20 is a top view of triple head integral structure 300, having connecting flow passages between upstanding chambers which are designed to hold, from left to right, a sediment cartridge, a RO module cartridge and activated carbon cartridge. FIG. 21 is a side elevational view of head structure 300 of FIG. 20 in cross section taken through plane 21—21 thereof. FIG. 22 is a bottom plan view of structure 300 as seen from bottom of FIG. 20. FIG. 23 is an elevational side view of structure 300 as seen through plane 23—23 of FIG. 22 with the bottom of the structure facing upwards and the top of the structure facing downwards. FIG. 24 is an end view of structure 300 of FIG. 20 as seen through plane 24—24 thereof, i.e. the left side of FIG. 20. FIG. 25 is an end view of structure 300 of FIG. 20 as seen through plane 25—25 thereof, i.e. the right side of FIG. 20. FIG. 26 is an elevational view in cross section of structure 300 as seen through plane 26—26 of FIG. 21. FIG. 27 is another elevational view in cross section of structure 300 as seen through staggered line 27—27 of FIG. 21.

The triple head integral structure 300 of FIGS. 20 to 27 comprises first head section 302, second head section 304 and third head section 306. As in head 12, each of the head sections contains a set of diametrically opposed tab receptacles, i.e. tab receptacles 308 and 310, 312 and 314, and 316 and 318. Each of the head sections also contains an upstanding chamber, i.e. chambers 320, 322 and 324, respectively. Inlet 326 is in sealed fluid communication with chamber 320 and is intended to be in sealed communication with inlet openings 70 of the disposable sediment canister shown in FIG. 9 with outlet opening 72 thereof being in sealed fluid communication with passageway 328 of structure 300. Opening 329, provided for injection molding purposes, is normally sealed with a plug. Passageway 328 is in sealed fluid communication with chamber 322 which is intended to receive the disposable RO module canister shown in FIG. 14 with inlet bore 186 thereof in sealed communication with passageway 328, and outlet openings 70 of the canister being in sealed fluid communication with passageway 300 of structure 300. The outlet of passageway 330 is in sealed fluid communication with chamber 324 which is intended to receive the disposable activated carbon canister shown in FIG. 8 with inlet openings 70 thereof being in sealed fluid communication with passageway 330 and outlet opening 72 of the canister being in sealed fluid communication with outlet 332 of structure 300. Opening 334 of structure 300, also provided for injection molding purposes, is normally sealed with a plug.

Accordingly, when sediment, RO module and activated carbon canisters are coupled to chambers 320, 322 and 324, respectively, of triple head structure 300, water directed at inlet 326 thereof will be first subjected to a prefiltering in the sediment canister, the filtrate therefrom will thence slow through passageway 328 to the RO module canister and be subjected to reverse osmosis filtration to remove dissolved substances and small undissolved matter including bacteria. The permeate from the RO module canister will then flow through passageway 330 to the activated carbon canister wherein additional dissolved chloride will be removed and the filtrate therefrom will be discharged from outlet 332 of structure 300. It can be appreciated that with the above embodiment of this invention all three disposable canisters can be very easily removed and replaced, with no special tools, in a matter of a few minutes by an ordinary person without any significant mechanical skills. If desired, the necks of three canisters and three upstanding chambers in structure 300 can be made with slightly different dimensions so that each canister will be accepted by only one chamber to prevent incorrect arrangement of the canisters in the structure.

Structure 300 is also preferably integrally constructed with mounting means such as mounting brackets 336 and 338 and hole 340. By integrally constructed or formed as used herein is meant that the structure or piece is essentially a single piece of material. For example, structure 300 is formed from a single piece of plastic produced by injection molding. The only addition parts of triple head 300 required to make the head completely functional are two plugs for sealing openings 329 and 334.

Although the present invention has been described with respect to a preferred embodiment thereof, many other variations, modifications and other uses will now become apparent to those skilled in the art. It is preferred therefore that the present invention be limited not by the specific embodiment disclosed herein but only by the appended claims.

What is claimed is:

1. A replacement filter canister comprising:
   a flask shaped housing having a main body with a top surface and a cylindrical neck of substantially uniform diameter projecting from said top surface said substantially uniform diameter defining a cylindrical surface, said neck having an internal surface;

a tube disposed in said housing and extending into said neck, the cross-sectional area of said tube being smaller than the internal cross-sectional area of said internal surface of said neck to define a clearance therebetween, said clearance being sealed adjacent the upper distal end of said tube and the upper distal end of said neck;

a first seal disposed circumferentially in and around said neck and proximate its upper distal end;

a second seal disposed circumferentially in and around said neck below said first seal;

at least one opening into the interior of said canister located between said first seal and said second seal, said opening extending radially inwardly from said cylindrical surface of said neck to said clearance; and means for filtering disposed in said main body of said housing below said top surface thereof, whereby fluid directed at said at least one opening will flow into said canister through said clearance between said neck and said tube, thence flow through said means for filtering and thence flow out of said canister through said tube.

2. The canister of claim 1, further comprising means for securing said canister to a head intended to receive said canister.

3. A replacement filter canister for a permanently installed filter head of a type having inlet and outlet ports in fluid communication with a cylindrical chamber intended to receive said canister, said canister comprising:

a flask shaped housing having a main body with a top surface and a cylindrical neck of substantially uniform diameter projecting from said top surface, said substantially uniform diameter defining a cylindrical surface, said neck having an internal surface, said neck being intended to be slidably received in said central cylindrical chamber of said head;

a tube disposed in said housing and extending into said neck, the cross-sectional area of said tube being smaller than the internal cross-sectional area of said internal surface of the neck to define a clearance therebetween, said clearance being sealed adjacent the upper distal end of said tube and the upper distal end of said neck;

a first seal disposed circumferentially in and around said neck and proximate its upper distal end;

a second seal disposed circumferentially in and around said neck below said first seal;

at least one opening into the interior of said canister located between said first seal and said second seal, said opening extending radially inwardly from said cylindrical surface of said neck to said clearance, said first and second seals being operable for making slidable seals with the interior surface of said cylindrical chamber of said head such that one of said inlet and outlet ports of said head is in sealed fluid communication with the interior of said canister through said tube and wherein the other one of said inlet and outlet ports of said head is in sealed fluid communication with the interior of said canister through said at least one opening in said canister; and means for filtering disposed in said main body of said housing below said top surface thereof, whereby fluid directed at said at least one opening will flow into said canister through said means for filtering and thence flow out of said canister through said tube.

4. The canister of claim 3, further comprising means for securing said canister to said head.

5. A replacement filter canister for a head intended to receive said filter canister, said filter canister comprising:

a flask shaped housing having a main body with a top surface and a cylindrical neck projecting from said top surface, said neck having a top, an external cylindrical surface and an internal surface, said neck having an external diameter which is approximately uniform over the entire height of said neck from said top surface of said main body to said top of said neck;

a tube means for conveying fluids, said tube means being disposed in said housing and having an upper part extending into said neck and a lower part in sealed fluid communication with said upper part and extending below said neck, the cross-sectional area of said upper part of said tube means being smaller than the internal cross-sectional area of said internal surface of said neck proximate thereto to define a clearance therebetween, said clearance being in sealed fluid communication with a first opening extending from said top of said neck to said clearance;

a first seal disposed circumferentially in and around said external cylindrical surface of said neck and proximate to and below said top of said neck;

a second seal disposed circumferentially in and around said external cylindrical surface of said neck and below said first seal, and at least one second opening into the interior of said canister located between said first seal and said second seal, said at least one second opening extending radially inwardly from said external cylindrical surface of said neck;

means for filtering disposed in said housing whereby fluid directed at said first opening will flow into said canister through said clearance between said neck and said upper part of said tube means, thence flow through said means for filtering, thence flow through said tube means and thence flow out of said canister through said at least one second opening.

6. The canister of claim 5, further comprising means for securing said canister to said head.

* * * * *